US007047856B2

(12) United States Patent  
Nurenberg et al.

(10) Patent No.: US 7,047,856 B2  
(45) Date of Patent: May 23, 2006

(54) SAW TABLE (75) Inventors: Aundrea Nurenberg, Brown City, MI (US); Michael C. Clark, Columbiaville, MI (US); Benjamin L. Pinchback, Lake Orion, MI (US); Richard J. Logan, Oxford, MI (US); Clyde G. Allen, Lapeer, MI (US)

(73) Assignee: Tapco International Corporation, Wixom, MI (US)

( * ) Notice: Subject to any disclaimer, the term of this patent is extended or adjusted under 35 U.S.C. 154(b) by 204 days.

(21) Appl. No.: 10/765,551

(22) Filed: Jan. 26, 2004

(65) Prior Publication Data

US 2004/0163520 A1 Aug. 26, 2004

Related U.S. Application Data (60) Provisional application No. 60/442,303, filed on Jan. 24, 2003, provisional application No. 60/490,675, filed on Jul. 29, 2003.

(51) Int. Cl.  
B27B 5/20 (2006.01)

(52) U.S. Cl. .................. 83/471.3; 83/477.1; 83/485

(58) Field of Classification Search ............... 83/471.3, 83/471, 472, 473, 468.1, 574, 581, 477, 477.1, 83/483, 485  
See application file for complete search history.

(56) References Cited

U.S. PATENT DOCUMENTS

| 3,727,502 | A |   | 4/1973  | Steinman |
| 3,872,755 | A |   | 3/1975  | Marsh et al. |
| 3,955,456 | A |   | 5/1976  | Van Cleave |
| 3,991,643 | A |   | 11/1976 | Girardin |
| 4,007,657 | A |   | 2/1977  | Burch |
| 4,133,237 | A |   | 1/1979  | Lewin |
| 4,327,619 | A |   | 5/1982  | McNamee, Jr. |
| 4,354,410 | A |   | 10/1982 | Stubbings |
| 4,840,097 | A |   | 6/1989  | Campbell |
| 4,916,994 | A |   | 4/1990  | Hatala |
| 4,972,748 | A |   | 11/1990 | Walsh |
| 5,404,779 | A |   | 4/1995  | Break |
| 5,421,231 | A |   | 6/1995  | Break et al. |
| 5,473,968 | A |   | 12/1995 | Break et al. |
| 5,533,556 | A | * | 7/1996  | Whitney ............... 144/144.52 |
| 5,577,429 | A |   | 11/1996 | Noble |
| 5,582,088 | A |   | 12/1996 | Harter |
| 5,651,298 | A |   | 7/1997  | Break et al. |
| 5,868,054 | A |   | 2/1999  | Chubb et al. |
| 5,899,132 | A |   | 5/1999  | Break et al. |
| 6,672,348 | B1 |  | 1/2004  | Ransom et al. |
| 6,705,192 | B1 |  | 3/2004  | Logan |
| 6,918,330 | B1 | * | 7/2005 | Ng et al. ................... 83/471.3 |

* cited by examiner

Primary Examiner—Charles Goodman  
(74) Attorney, Agent, or Firm—Howard & Howard (57) ABSTRACT A saw table assembly for cutting a workpiece with a saw. A pair of rails for supporting a working surface and a track. The suitable work surface includes a first group and a second group of table sections with extension rails disposed within the table sections. A coupling assembly, disposed at the center of the rails, for supporting the saw track. The saw track can slide longitudinally and pivot back and forth about the coupling assembly. The coupling assembly including a cam which has three different operating positions.

33 Claims, 10 Drawing Sheets

SAW TABLE

The subject patent application claims priority to all the benefits of U.S. Provisional Patent Applications Ser. Nos. 60/442,303, filed on Jan. 24, 2003 and 60/490,675, filed on Jul. 29, 2003.

BACKGROUND OF THE INVENTION

Field of the Invention

The subject invention relates to portable saw tables for supporting a saw and a workpiece during cutting.

SUMMARY OF THE INVENTION AND ADVANTAGES

The present invention provides a saw table assembly for cutting a workpiece. The saw table assembly includes a pair of rails and a plurality of table sections slidably supported on the rails. The table may have its own legs or leg stand, may be set on sawhorses, or may be set on any device available to the user as decided by the user. The table sections form a working surface to support the workpiece. A plurality of extension rails is disposed within the table sections, to extend the working surface. The working surface can also be expanded by interlocking at least one unsupported table section to the table sections that are supported on the rails.

The saw table assembly also includes a saw track slidably supporting a saw for cutting the workpiece. A coupling assembly supports the saw track. The coupling assembly is attached at the general midpoint of the rails. The saw track has three operating positions. In the first position, the saw track is removable from the saw table assembly. In the second position, the saw track is secured to the coupling assembly yet still able to slidably move and pivot. In the third position, the saw track is locked securely to the saw table assembly and unmovable.

The present invention provides several advantages over the prior art. One advantage is the capability of the saw track to slide longitudinally and pivot back and forth on the coupling assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 11 is a perspective view of an end cap, separated from the rails, with spring plungers;

FIG. 12 is a perspective view of the saw table assembly, with the end cap connecting, showing the spring plungers holding the table sections in place;

FIG. 13 is a perspective view of the saw table assembly showing heads of the spring plungers depressed to allow the table sections to move freely;

FIG. 14 is a perspective view of the extension rail showing a first embodiment of the spring plunger supported by a tab;

FIG. 15 is a perspective view of the extension rail showing a second embodiment of the spring plunger supported by the extension rail;

FIG. 16 is a perspective view of the saw table with the extension rails held completely within the table sections by the spring plungers; and FIG. 17 is a perspective view of the saw table with the extension rails held in place by the spring plungers while extended out of table sections.

DETAILED DESCRIPTION OF THE PREFERRED EMBODIMENT

Figure 1:
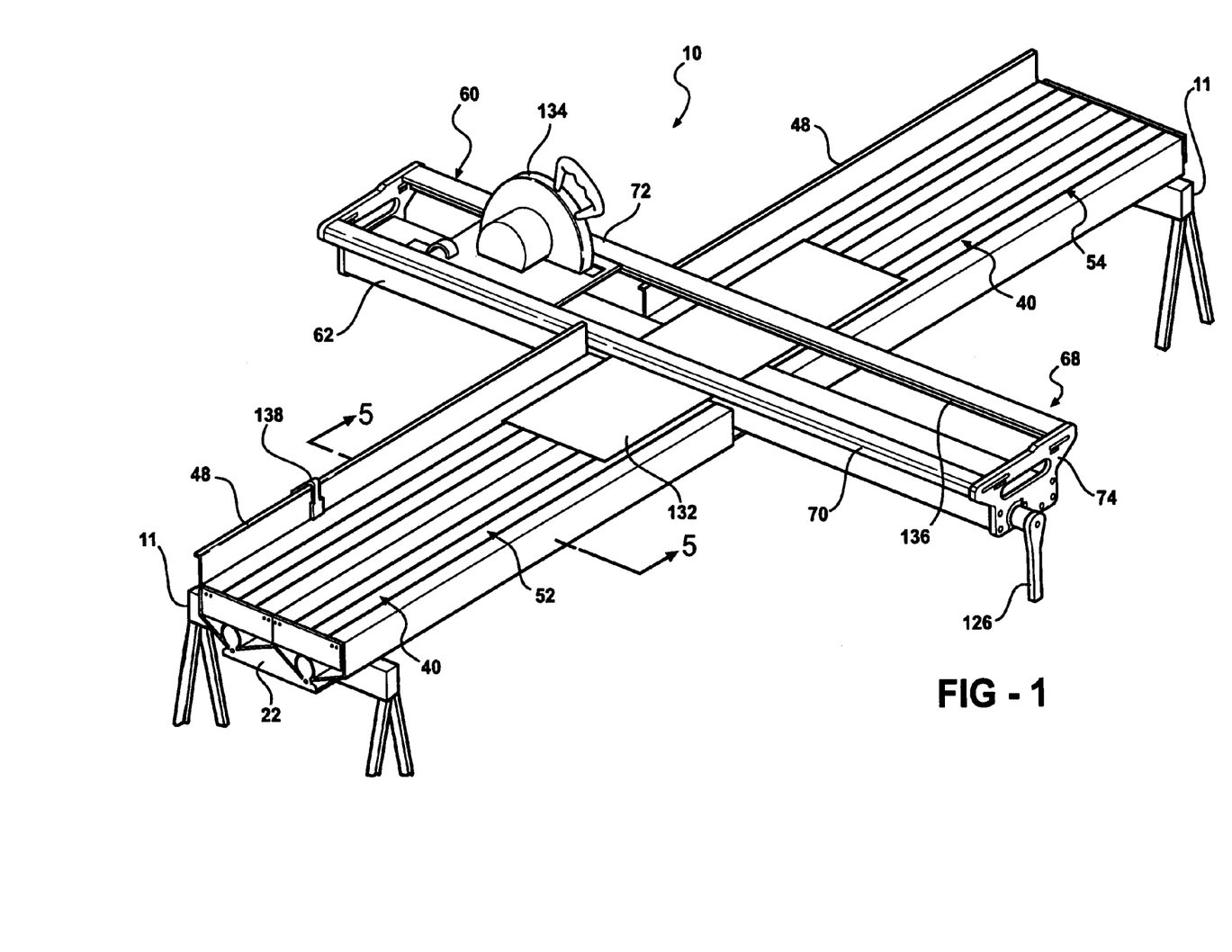
FIG. 1 is a perspective view of the saw table assembly with the saw track attached and perpendicular to the work surface.

Referring to the various drawings, wherein like numerals indicate like or corresponding parts throughout the several views, a saw table assembly for supporting a saw 134 and for cutting a workpiece 132 is shown generally at 10 in FIG. 1. The saw table assembly 10 is set on a schematic representation of two sawhorses 11 in FIG. 1, but may be supported in any manner determined and selected by the user, including the possibility of a leg stand or custom legs for the saw table assembly 10.

Figure 2:
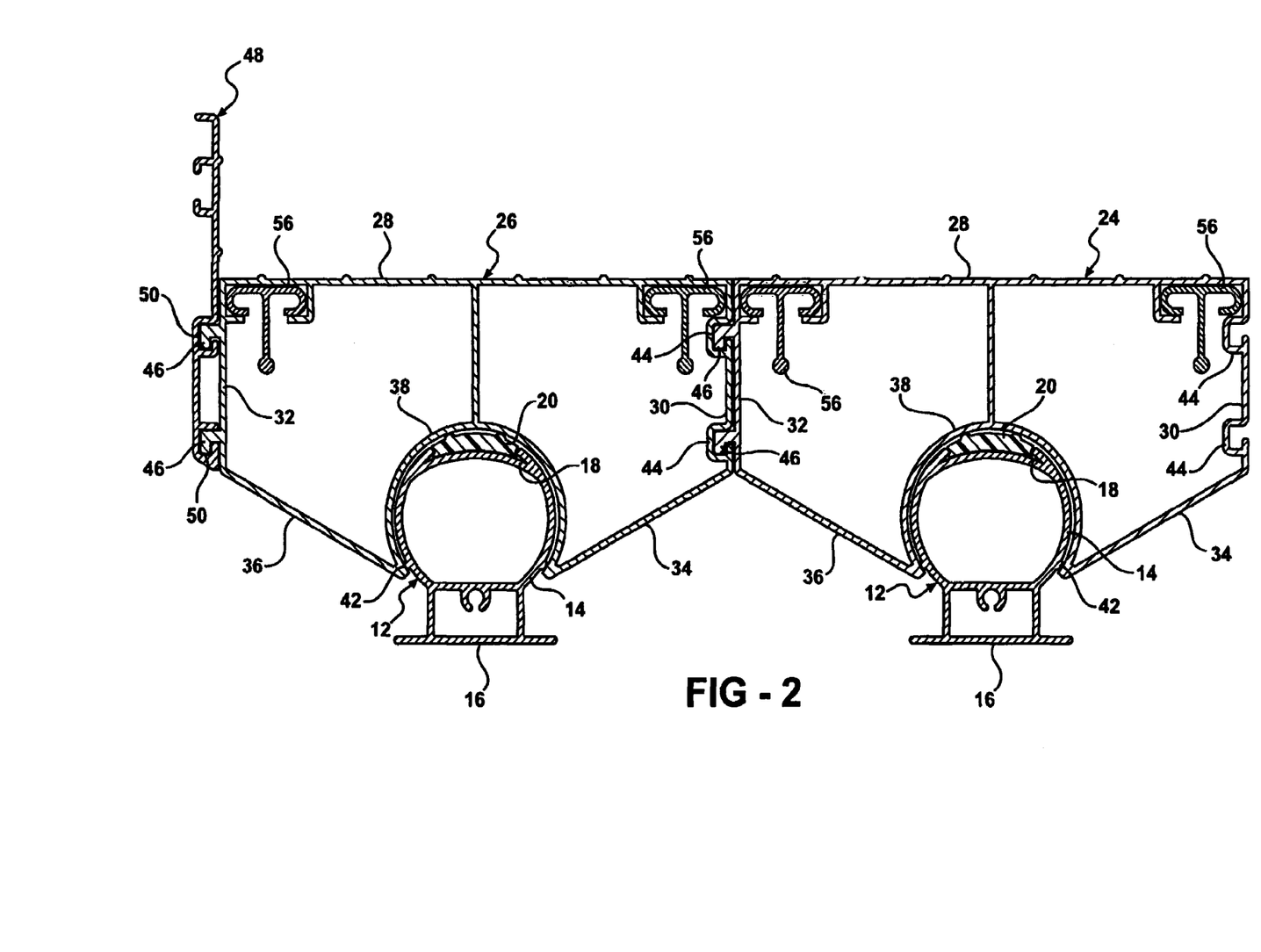
FIG. 2 is a cross-sectional view of the saw table assembly, along the lines A—A of FIG. 1, showing the rails, the table sections, and the material guide.

Referring to the cross-sectional representation in FIG. 2, a pair of rails 12 is shown, parallel to and spread from one another. Each rail 12 has a rail portion 14, with a generally circular cross-section, and a flat support portion 16 for supporting the rail portion 14. The rails 12 are preferably made from aluminum, but may also comprise other materials such as steel, plastic, and the like. The generally circular cross-section of the rail portion 14 includes a recess 18. A rail glide strip 20 is supported in the recess 18.

A first table section 24 and a second table section 26 are slidably supported on the rail portions 14. Each of the table sections 24, 26 has a pentagonal cross section including a top 28, a first side 30, a second side 32, a first bottom 34, and a second bottom 36 extending between opposite ends thereof. A semi-circular channel 38 extends along each of the table sections 24, 26 and is disposed between the first bottom 34 and the second bottom 36. This channel 38 of the first table section 24 slidably engages one of the rail portions 14 and the channel of the second table section 26 slidably engages the other of the rail portions 14. The rail portions 14 include a plurality of nubs 42 to functionally interface with the table sections 24, 26.

The first side 30 of each table section 24, 26 has a groove 44 extending between the ends of the table section 24, 26. The groove 44 is generally hook shaped. The second side 32 of each table section 24, 26 includes a tongue 46 that is disposed in the groove 44 of an adjacent table section 26, 24. The tongue 46 is also generally hook shaped. The tongue 46 is slidably received in the groove 44. This tongue-and-groove arrangement allows the table sections 24, 26 to stay together yet slide independently along their respective rail portions 14 in a side by side and parallel relationship.

A material guide 48 has a support channel 50 that engages the tongue 46 along one of the table sections 26 and extends upward above the table section 26 to guide the workpiece 132 that is to be cut. As shown in FIG. 1, the material guide 48 extends between the opposite ends of the table section 26 to which the material guide 48 is engaged. An end cap 22 covers the ends of each rail 12 to prevent dirt and contaminants from entering the rails 12 and maintains separation between the rails 12.

A material stop 138 is supported by the material guide 48. The material stop 138 includes a stop portion (not shown) and an attaching portion (not shown). A hinge (not shown) separates the stop portion and the attaching portion. The attaching portion includes a fastener (not shown) to secure the material stop 138 to the material guide 48. The hinge allows the stop portion to be moved out of the way without loosening the fastener from the material guide 48.

As also shown in FIG. 1, a working surface 40 is formed by the table sections 24, 26. The working surface 40 includes a first group 52 of table sections 24, 26 and a second group 54 of table sections 24, 26. The two groups 52, 54 are separated longitudinally along the rails 12 for sliding along the rail portions 14 independently of one another. At least one of the groups can include an unsupported table section (not shown). Specifically, the unsupported table section is not supported by a rail portion 14, and is retained thereto by the tongue 46 and the groove 44. The unsupported table section is used to create a larger working surface 40 to support a workpiece 132.

Figure 3:
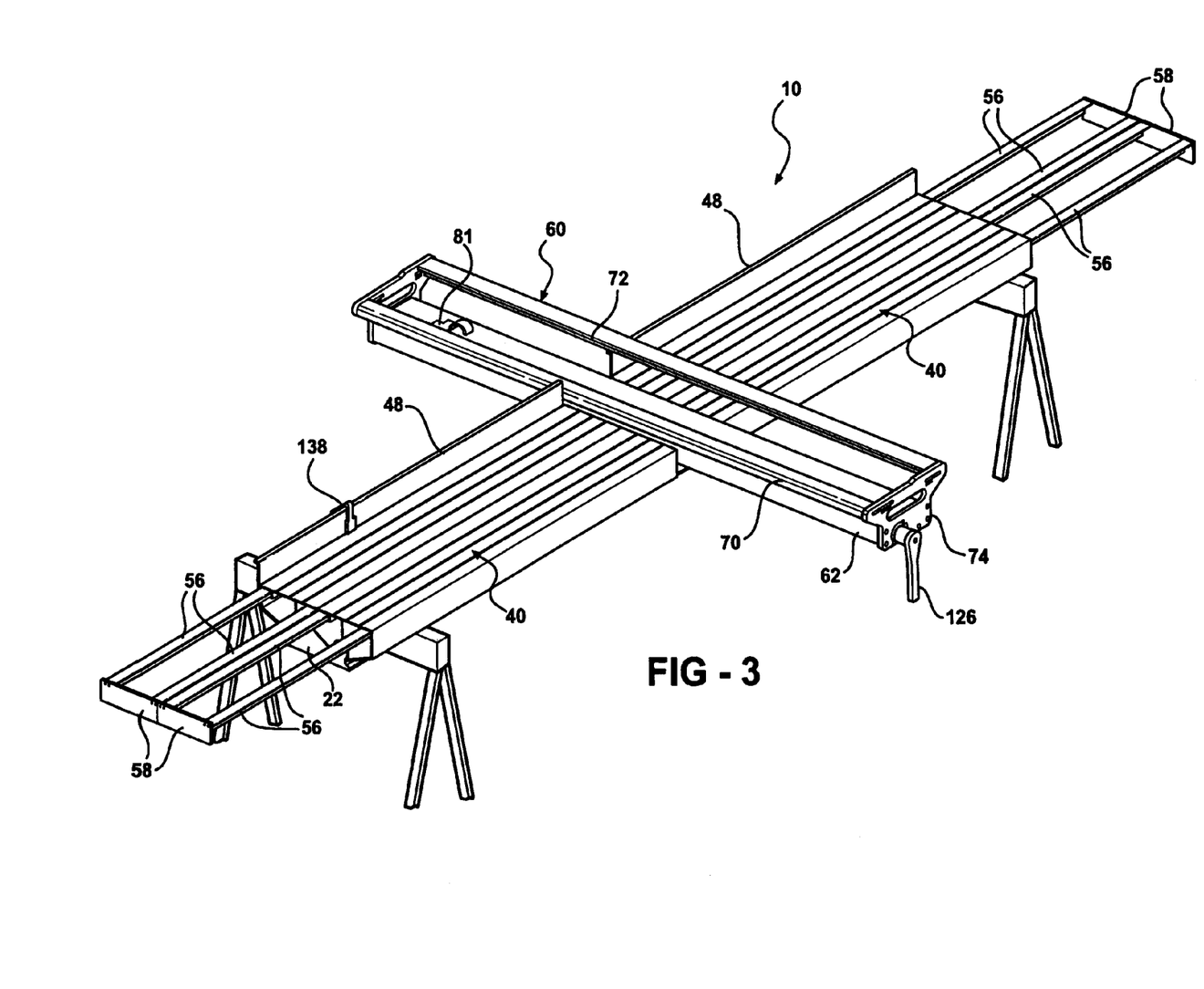
FIG. 3 is a perspective view of a saw table assembly with a saw track attached and perpendicular to the work surface, and all extension rails fully extended.
Figure 4:
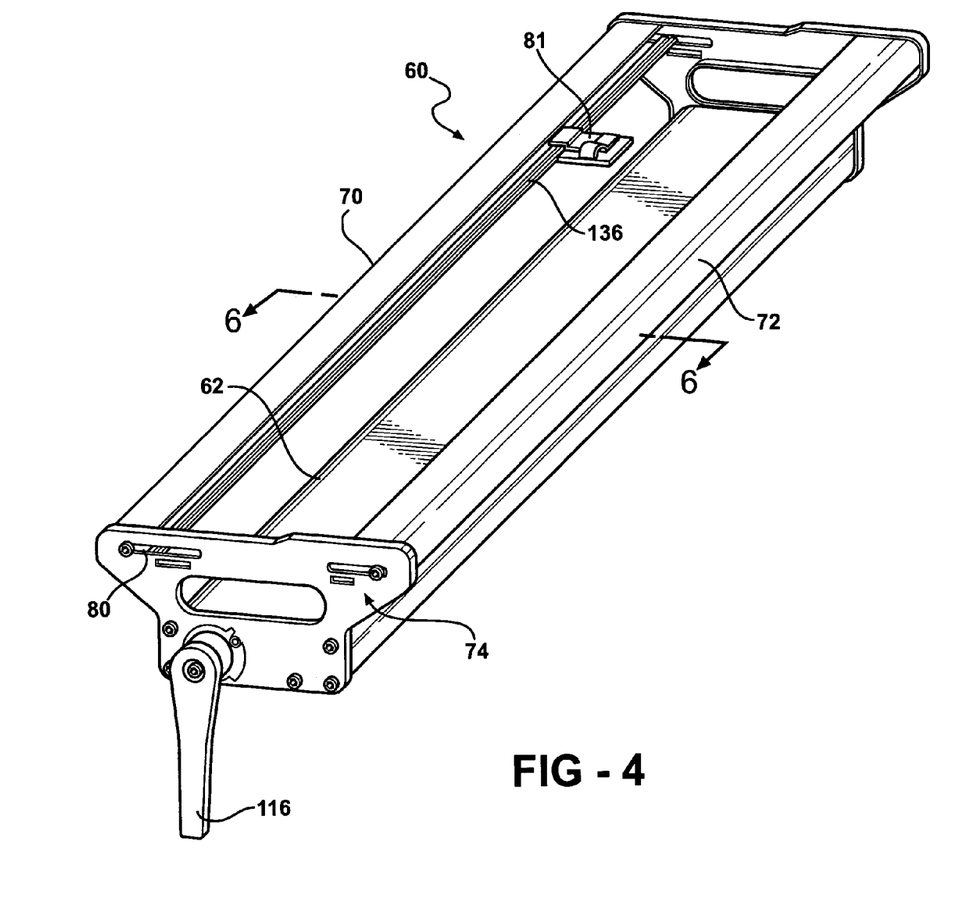
FIG. 4 is a perspective view of the saw track.

Referring to FIGS. 2 and 3, a pair of extension rails 56 is disposed in telescoping relationship with one end of each table portion 24, 26. The extension rails 56 have a T-shaped cross section and are stored within the table portion 24, 26 when not in use. A cross bar 58 interconnects each pair of extension rails 56 and acts as a handle to move the extension rails 56 in and out of the table portions 24, 26. The extension rails 56 extend the working surface to support a very long workpiece 132.

Figure 5:
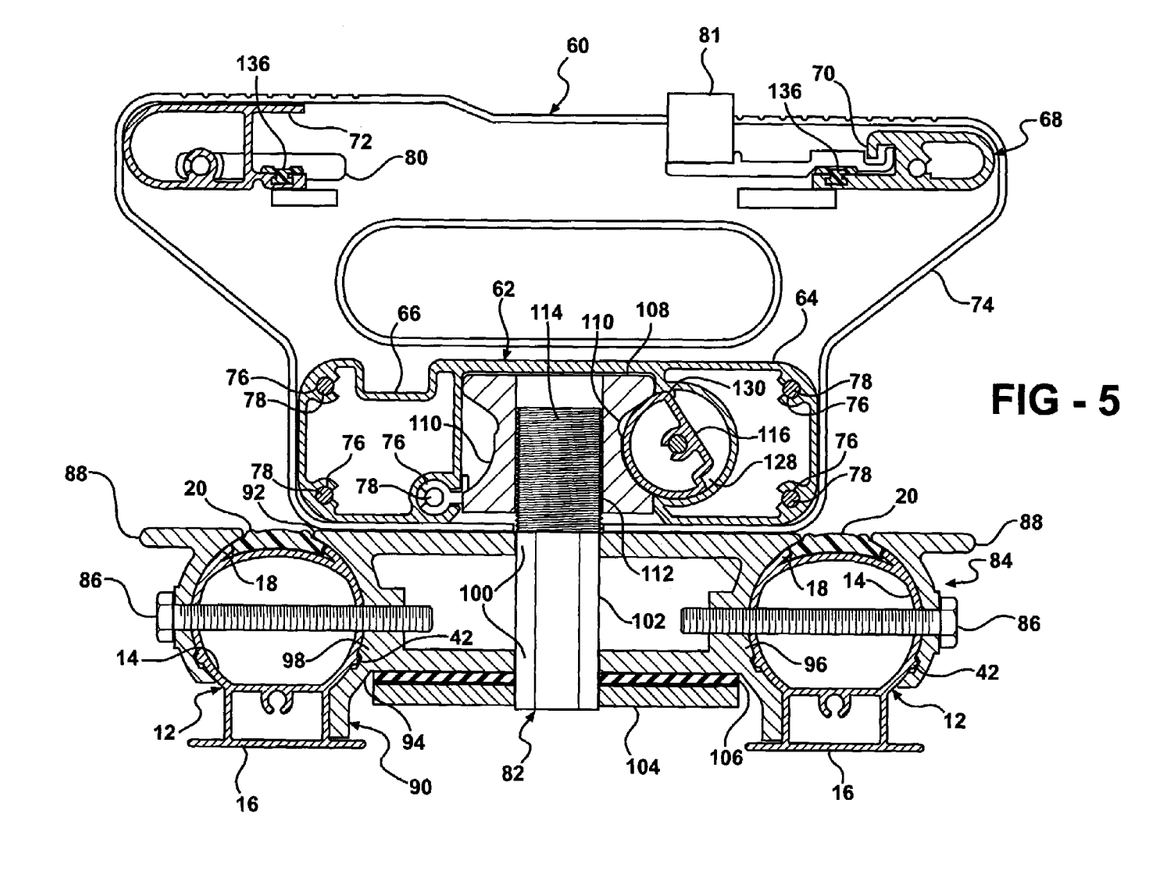
FIG. 5 is a cross-sectional view of the saw table assembly, along the lines 5—5 of FIG. 1, with the table sections removed and the saw track attached and turned parallel to the rails.

Referring back to FIG. 1, a saw track 60 is disposed between the first group 52 and the second group 54 and includes a lower platform 62 to support the workpiece 132 that is to be cut. Referring now to FIG. 5, The lower platform 62 has a top 64 with a recess 66 for receiving the blade of the saw 134 during cutting. The recess 66 ensures the blade does not contact the lower platform 62.

The saw track 60 also includes an upper guide 68 for guiding the saw 134 therealong for cutting the workpiece 132. The upper guide 68 has a first slideway 70 and a second slideway 72. A slideway glide strip 136 is supported in both the first slideway 70 and the second slideway 72 for allowing the saw 134 to move easily along the upper guide 68. A pair of end brackets 74 connects the ends of the lower platform 62 with the ends of the first slideway 70 and the ends of the second slideway 72. The end brackets 74 contain circular holes 76 for attaching the lower platform 62 with fasteners 78. The end brackets 74 also contain ovular holes 80 for attaching the first slideway 70 and the second sideway 72 with fasteners 78. The ovular holes 80 allow the first slideway 70 and the second slideway 72 to be moved, back and forth, to adjust for various saw sizes. The first slideway 70 has a smaller cross-sectional height than that of the second slideway 72.

The saw track 60 includes a retaining piece 81 that attaches to the saw 134. The retaining piece 81 fits inside the first slideway 70 to prevent accidental removal of the saw 134 from the upper guide 68.

Still referring to FIG. 5, an illustrative diagram showing the table sections 24,26 removed and the saw track 60 parallel to the rails 12, a coupling assembly 82 supports the saw track 60. The coupling assembly 82 includes a bracket 84, which is disposed at the center of the rails 12. The bracket 84 includes a plurality of bolts 86, a pair of outer pieces 88, and an inner piece 90. The inner piece 90 has a top 92, a bottom 94, a first side 96, and a second side 98, with circular holes 100 disposed in the top 92 and the bottom 94. The first side 96 and the second side 98 of the inner piece 90, and the outer pieces 88 have a semicircular shape to mate with the rail portions 14. A plurality of bolts 86 fasten the outer pieces 88 and the inner piece 90 to the rail portions 14.

The coupling assembly 82 also includes a cylinder 102 and a plate 104. The cylinder 102 is affixed to the center of the plate 104 in a perpendicular relationship. The cylinder 102 includes a threaded end 114. The plate 104 supports a gripping ring 106. The cylinder passes through the holes 100 disposed in the inner piece 90 with the gripping ring 106 disposed between the plate 104 and the bottom of the inner piece 90.

The coupling assembly 82 also includes a locking block 108. The locking block 108 has a generally cubical shape and includes two semi-circular recesses 110 and a threaded circular void 112. The threaded circular void 112 operatively connects to the threaded end 114 of the cylinder 102. The locking block 108 is disposed in the lower platform 62 of the saw track 60.

A cam 116 is located within and extends the length of the lower platform 62 and has a D-shaped cross section. The cam 116 interfaces with one of the semi-circular recesses 110 on the locking block 108. The cam 116 provides three operating positions for the saw track 60.

Figure 6A:
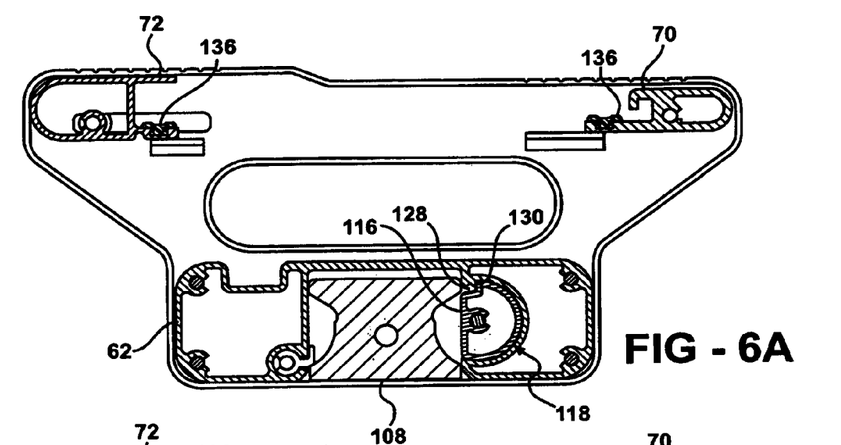
FIG. 6A is a cross-sectional view of the saw track, along the lines 6—6 of FIG. 4, with the locking block and the cam, showing the cam in a first position.
Figure 6B:
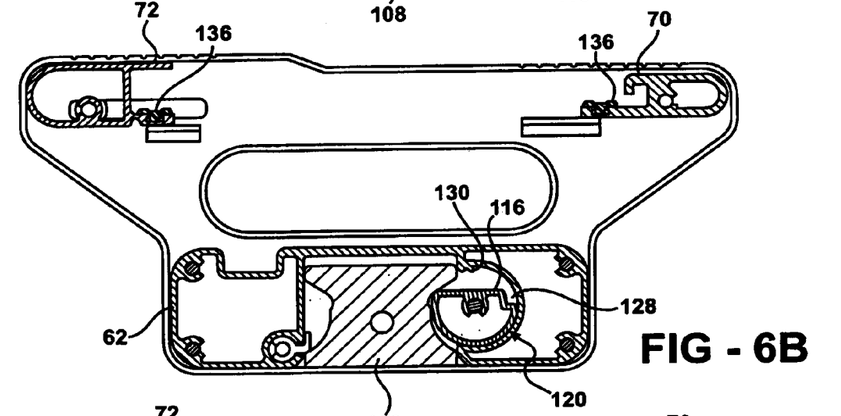
FIG. 6B is a cross-sectional view of the saw track showing the cam in a second position.
Figure 6C:
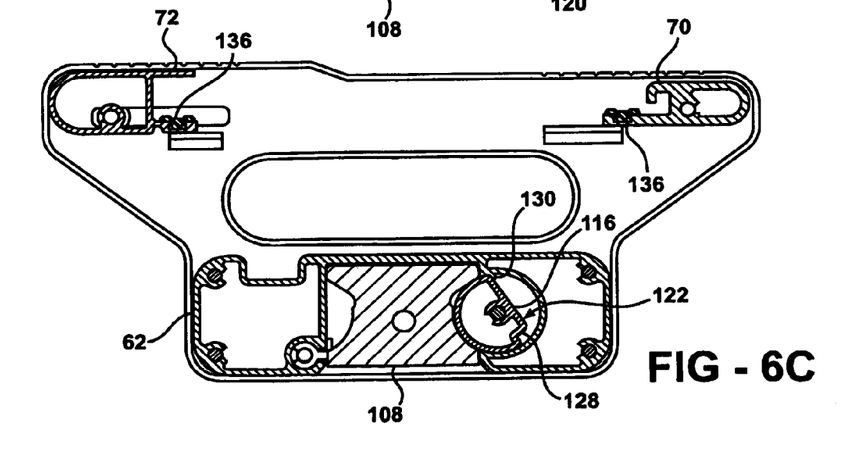
FIG. 6C is a cross-sectional view of the saw track showing the, cam in a third position.

Referring to FIG. 6A, a first position 118 allows removal of the saw track 60 from the rail portions 14. In FIG. 6B, a second position 120 partially engages the locking block 108 to capture the saw track 60 on the rail portions 14 while allowing pivoting and movement along the rail portions 14. A third position 122, as shown in FIG. 6C, fully engages the locking block 108 to lock the saw track 60 in place on the rail portions 14. A notch 128 is placed on the cross-section of the cam 116 to prevent the cam 116 from rotating past the first position 118. Likewise, a tab 130 is placed in the lower platform 62 to prevent the cam 116 from rotating past the third position 122. The end of the cam 116 protrudes through a hole (not shown) in the end plate.

Figure 7A:
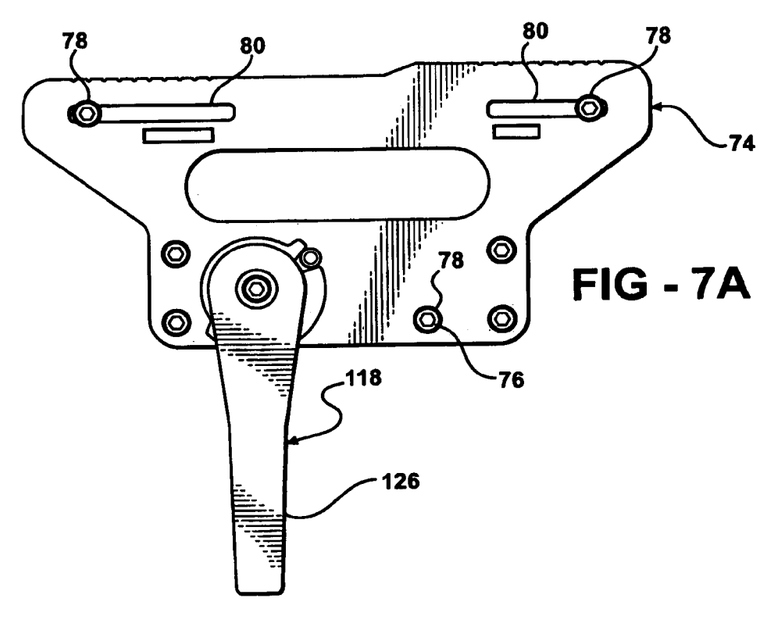
FIG. 7A is an elevation view of a saw track end bracket with a handle in the first position.
Figure 7B:
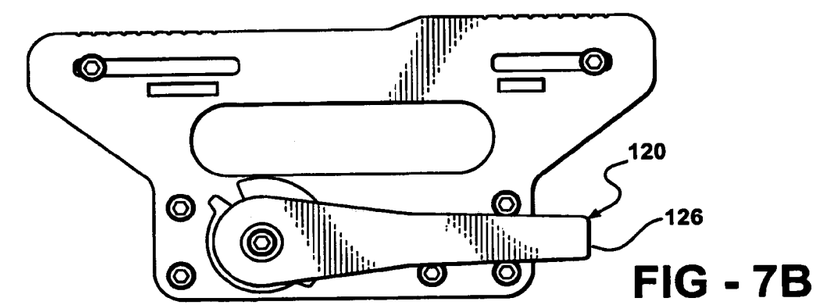
FIG. 7B is an elevation view of the saw track end bracket with the handle in the second position.
Figure 7C:
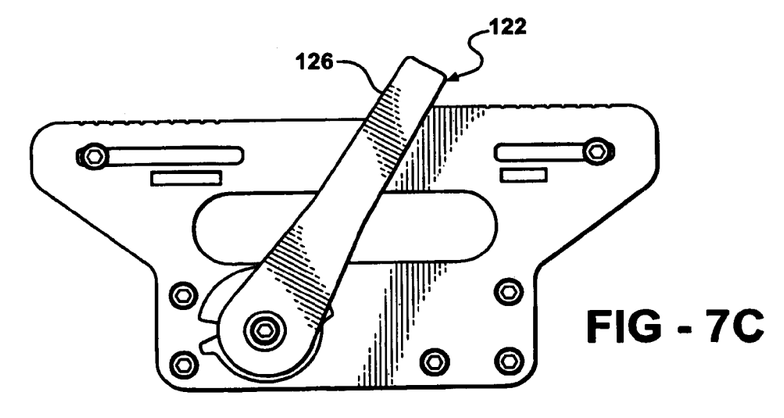
FIG. 7C is an elevation view of the saw track end bracket with the handle in the third position.

Referring to FIGS. 7A, 7B, and 7C, a handle 126 is connected to the cam 116 for manually rotating the cam 116 between the operating positions. The handle 126 is rotated counterclockwise to move the cam 116 from the first position 118, to the second position 120, to the third position 122.

Figure 8:
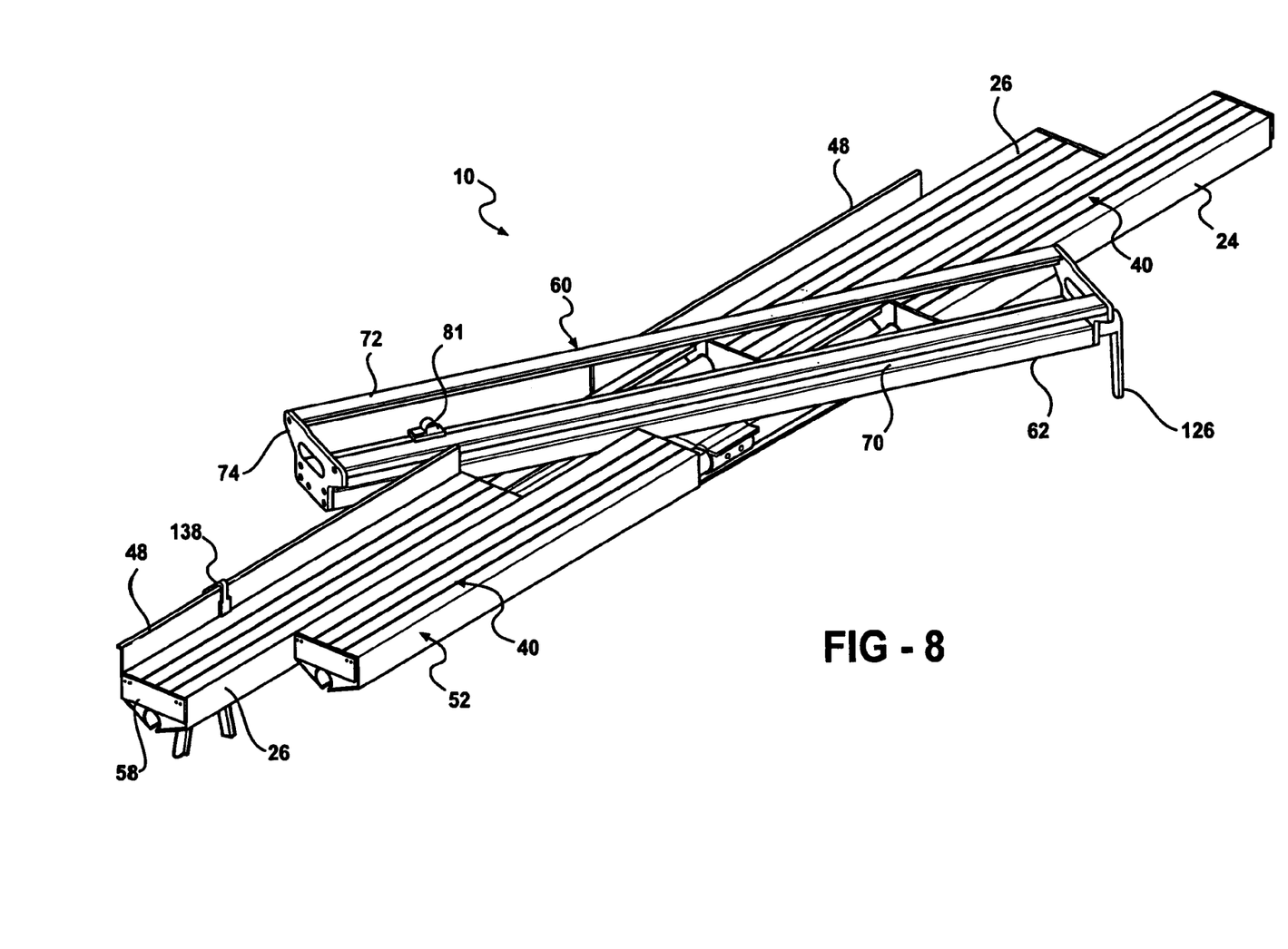
FIG. 8 is a perspective view of the saw table assembly with the saw track attached and not perpendicular to the work surface.
Figure 9:
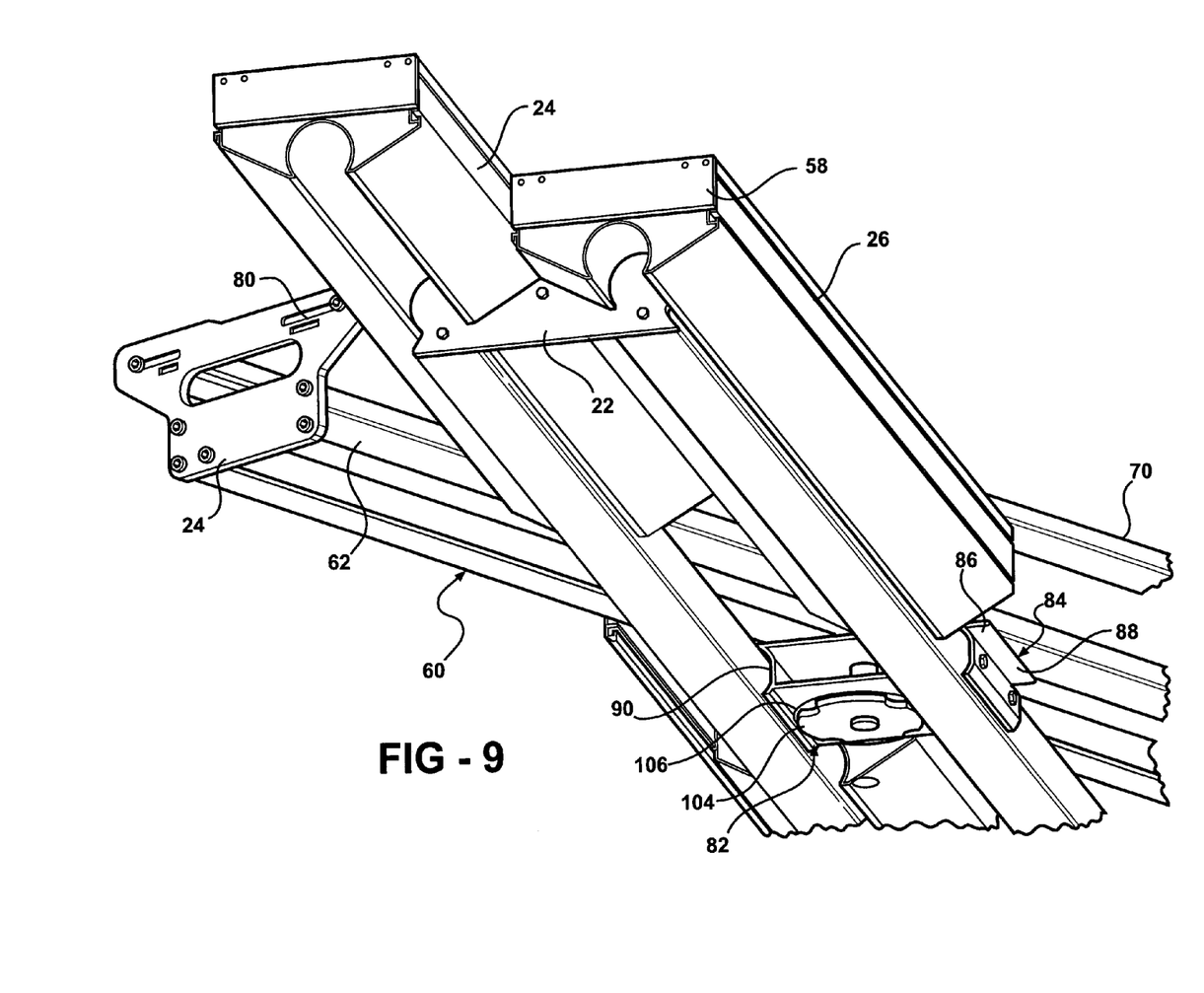
FIG. 9 is a perspective view of the bottom of the saw table assembly with the saw track attached and not perpendicular to the work surface.
Figure 10:
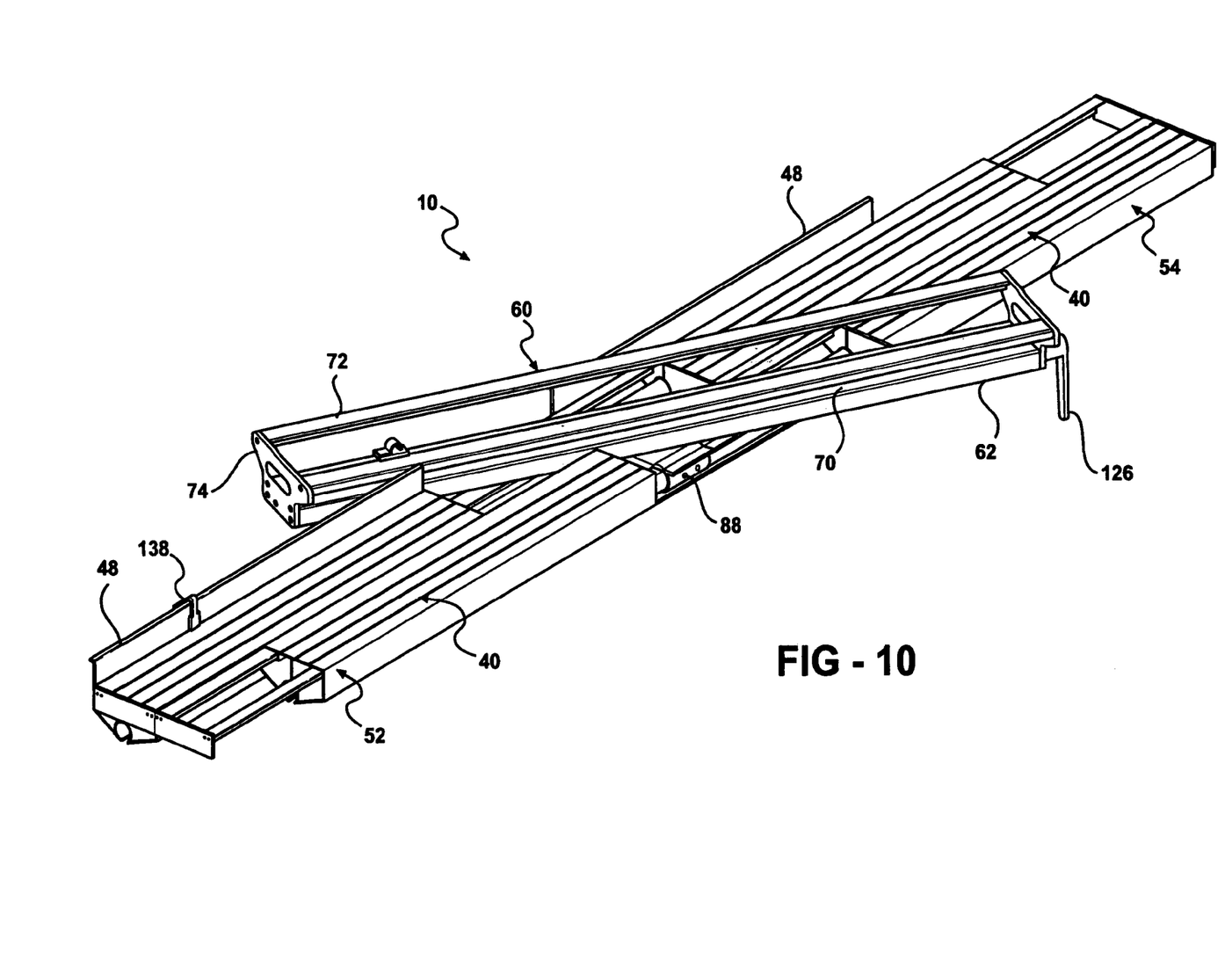
FIG. 10 is a perspective view of the saw table assembly with the saw track attached and not perpendicular to the work surface, with some extension rails extended.

Referring to FIG. 8, the operational advantages of the present invention can be appreciated. To make an angled cut in the workpiece 132 the saw track 60 is rotated to the desired angle. Note that the table sections 24, 26 slide along the rails 12 as necessary to accommodate the rotated saw track 60. FIG. 9 shows a similar saw track 60 position with a bottom-view perspective. FIG. 10 shows a similar saw track 60 position with two pairs of extension rails 56 extended to square the working surface 40.

Referring now to FIG. 11, at least one spring plunger 140 is supported by the end cap 22. Each spring plunger 140 includes a head 142 disposed in a housing 144. A spring (not shown) is also disposed in the housing 144 to keep the head 142 extended out of the housing 144.

As shown in FIG. 12, the heads 142 of the spring plungers 140 engage with an end 146 of the table sections 24, 26. This engagement prevents the table sections 24, 26 from sliding along the rails 12. This is particularly useful when the saw table 10 is being transported. Referring now to FIG. 13, the head 142 can be depressed into the housing 144 to disengage the edge of the table sections 24, 26 and allowing the table sections 24, 26 to slide freely along the rails 12.

Spring plungers 140 may also be interfaced with the extension rails 56. In a first embodiment, as shown in FIG. 14, a tab 148 extends from the end 150 of the extension rail 56 that does not connect to the cross bar 58. The tab 148 supports the spring plunger 140. In a second embodiment, as shown in FIG. 15, the spring plunger 140 is supported directly by the extension rail 56, adjacent the end 150 of the extension rail 56 that does not connected to the cross bar 58.

Referring now to FIG. 16, at least one bore 152 is disposed in the top 28 of each table sections 24, 26. Preferably, several bores 152 are disposed at various locations in the top 28 of each table section 24, 26. The heads 142 of the spring plungers 140 engage in these bores 152 to hold the extension rails 56 in place. One set of these bores 152 is located such that spring plungers 140 hold the extension rails 56 completely within the table sections 24, 26. This is particularly useful when the saw table 10 is being transported. Other sets of bores 152 may also be located in the tops 28 of the table sections 24, 26 to hold the extension rails 56 in place at various lengths of extension, as shown in FIG. 17.

Modifications and variations of the present invention are also possible in light of the above teachings.

What is claimed is:

1. A saw table assembly (10) for supporting a saw (134) for cutting a workpiece (132) comprising:
   at least one rail (12) for providing a support structure;
   a saw track (60) having a lower platform (62) for supporting the workpiece (132) and an upper guide (68) for guiding the saw (134) therealong for cutting the workpiece (132);
   a bracket (84) affixed to said rail (12) and supporting said saw track (60);
   a locking block (108) disposed above said bracket (84) and within said lower platform (62) of said saw track (60);
   a plate (104) disposed underneath said bracket (84) and operatively connected to said locking block (108);
   a cam (116) rotatably supported by said lower platform (62) for movement between a first position (118) and a second position (120) and a third position (122) wherein said cam (116) engages said locking block (108) in said second position (120) to capture said saw track (60) on said bracket (84) while allowing pivoting and movement of said saw track (60) and said cam (116) lifts said locking block (108) in said third position (122) to lift and engage said plate (104) against said bracket (84) for locking said saw track (60) in place and allowing removal of said saw track (60) from said bracket (84) in said first position (118); and
   wherein said locking block (108) includes a semi-circular recess (110) for interfacing with said cam (116).

2. A saw table assembly (10) as set forth in claim 1 wherein said cam (116) has a D-shaped cross section including a flat portion and a semi-circular portion wherein said semi-circular portion of said cam (116) engages said semi-circular recess (110) of said locking block (108) in said second position (120) to capture said saw track (60) on said bracket (84) while allowing pivoting and movement of said saw track (60) and said semi-circular portion of said cam (116) engages said semi-circular recess (110) of said locking block (108) to lift said locking block (108) in said third position (122) and engage said plate (104) against said bracket (84) for locking said saw track (60) in place and said flat portion of said cam (116) is generally parallel with said locking block (108) for allowing removal of said saw track (60) from said bracket (84) in said first position (118).

3. A saw table assembly (10) as set forth in claim 1 wherein said lower platform (62) further comprises a tab (130) to interface with said cam (116) for preventing said cam (116) from rotating past said third position (122).

4. A saw table assembly (10) as set forth in claim 3 wherein said cam (116) includes a notch (128) to interface with said tab (130) for preventing said cam (116) from rotating past said first position (118).

5. A saw table assembly (10) as set forth in claim 1 wherein said bracket (84) includes a circular hole (100) extending through said bracket (84) and further comprising a cylinder (102) affixed to said plate (104) in a perpendicular relationship and extending through said circular hole (100) of said bracket (84) and connecting to said locking block (108) for operatively connecting said plate (104) to said locking block (108).

6. A saw table assembly (10) as set forth in claim 1 wherein said upper guide (68) of said saw track (60) includes a first slideway (70) and a second slideway (72) for supporting the saw (134).

7. A saw table assembly (10) as set forth in claim 6 wherein said saw track (60) includes a pair of end brackets (74) connecting said lower platform (62) to said first and second slideways (70, 72).

8. A saw table assembly (10) as set forth in claim 7 wherein said end brackets (74) include oval holes (80) having oval shapes for attaching said first and second slideways (70, 72) with fasteners (78) and allowing said first and second slideways (70, 72) to be moved back and forth to adjust for variations in a size of the saw (134).

9. A saw table assembly (10) as set forth in claim 6 further comprising a retaining piece (81) engaged with said first slideway (70) for attachment to the saw (134) to prevent accidental removal of the saw (134) from said upper guide (68).

10. A saw table assembly (10) as set forth in claim 6 further comprising slideway glide strips (136) supported by said first and second slideways (70, 72) for allowing the saw (134) to move easily along said upper guide (68).

11. A saw table assembly (10) as set forth in claim 1 further comprising at least one table section (24, 26) supported by said rail (12) for further supporting the workpiece (132) and forming a working surface (40).

12. A saw table assembly (10) as set forth in claim 11 wherein said at least one rail (12) is further defined as a pair of rails (12), said at least one table section is further defined as a first table section (24) and a second table section (26), and said table sections (24, 26) are interlinked with one another and independently slidable along their respective rails (12).

13. A saw table assembly (10) as set forth in claim 12 wherein each of said table sections (24, 26) include a groove (44) disposed on a first side (30) of said table section (24, 26).

14. A saw table assembly (10) as set forth in claim 13 wherein each of said table sections (24, 26) include a tongue (46) disposed on a second side (32) of said table section (24, 26).

15. A saw table assembly (10) as set forth in claim 14 wherein said tongue (46) of one of said table sections (24, 26) is slidably received in said groove (44) of another of said table sections (26, 24) for interlinking said first table section (24) to said second table section (26).

16. A saw table assembly (10) as set forth in claim 14 further comprising a material guide (48) for guiding the workpiece (132) that is to be cut.

17. A saw table assembly (10) as set forth in claim 16 wherein said material guide (48) includes a support channel (50) for engaging with said tongue (46) of one of said table sections (24, 26).

18. A saw table assembly (10) as set forth in claim 14 further comprising an unsupported table section interlinked with at least one of said first table section (24) or said second table section (26).

19. A saw table assembly (10) as set forth in claim 11 further comprising at least one extension rail (56) disposed in telescoping relationship with said table section (24, 26) for extending said working surface (40).

20. A saw table assembly (10) as set forth in claim 19 wherein said extension rail (56) includes a spring plunger (140) engaging a bore (152) disposed in said table section (24, 26) for holding said extension rail (56) in place.

21. A saw table assembly (10) as set forth in claim 11 further comprising an end cap (22) for covering the end of said at least one rail (12) for preventing dirt and contaminants from entering said rail (12).

22. A saw table assembly (10) as set forth in claim 21 further comprising at least one spring plunger (140) supported by said end cap (22) for engaging with an end (146) of said table section (24, 26) to prevent said table section (24, 26) from sliding along said rail (12).

23. A saw table assembly (10) for supporting a saw (134) for cutting a workpiece (132) comprising:
at least one rail (12) for providing a support structure;
a saw track (60) having a lower platform (62) for supporting the workpiece (132) and an upper guide (68) for guiding the saw (134) therealong for cutting the workpiece (132);
a bracket (84) affixed to said rail (12) and supporting said saw track (60);
a locking block (108) disposed above said bracket (84) and within said lower platform (62) of said saw track (60);
a plate (104) disposed underneath said bracket (84) and operatively connected to said locking block (108);
a gripping ring (106) sandwiched between said plate (104) and said bracket (84) for increasing the coefficient of friction between said plate (104) and said bracket (84); and
a cam (116) rotatably supported by said lower platform (62) for movement between a first position (118) and a second position (120) and a third position (122) wherein said cam (116) engages said locking block (108) in said second position (120) to capture said saw track (60) on said bracket (84) while allowing pivoting and movement of said saw track (60) and said cam (116) lifts said locking block (108) in said third position (122) to lift and engage said plate (104) against said bracket (84) for locking said saw track (60) in place and allowing removal of said saw track (60) from said bracket (84) in said first position (118).

24. A saw table assembly (10) for supporting a saw (134) for cutting a workpiece (132) comprising:
a pair of rails (12) for providing a support structure;
a coupling assembly (82) supported by said rails (12);
a saw track (60) supported by said coupling assembly (82) and having a lower platform (62) for supporting the workpiece (132) and an upper guide (68) for guiding the saw (134) therealong for cutting the workpiece (132);
a first table section (24) and a second table section (26) supported by one of said pair of rails (12) for further supporting the workpiece (132) and forming a working surface (40); and
said table sections (24, 26) further including a groove (44) disposed on a first side (30) and a tongue (46) disposed on a second side (32) where said tongue (46) of one of said table sections (24, 26) is slidably received in said groove (44) of another of said table sections (26, 24) for interlinking said first table section (24) to said second table section (26).

25. A saw table assembly (10) as set forth in claim 24 further comprising at least one extension rail (56) disposed in telescoping relationship with said table section (24, 26) for extending said working surface (40).

26. A saw table assembly (10) as set forth in claim 25 wherein said extension rail (56) includes a spring plunger (140) engaging a bore (152) disposed in said table section (24, 26) for holding said extension rail (56) in place.

27. A saw table assembly (10) as set forth in claim 24 further comprising an end cap (22) for covering the end of said pair of rails (12) for preventing dirt and contaminants from entering said rails (12).

28. A saw table assembly (10) as set forth in claim 27 further comprising at least one spring plunger (140) supported by said end cap (22) for engaging with an end (146) of said table section (24, 26) to prevent said table section (24, 26) from sliding along said rail (12).

29. A saw table assembly (10) as set forth in claim 24 wherein said working surface (40) includes a first group (52) of table sections (24, 26) and a second group (54) of table sections (24, 26) separated longitudinally along said rails (12) by said coupling assembly (82).

30. A saw table assembly (10) as set forth in claim 24 further comprising an unsupported table section interlinked with at least one of said first table section (24) or said section table section (26) for increasing said working surface (40).

31. A saw table assembly (10) as set forth in claim 24 further comprising a material guide (48) for guiding the workpiece (132) that is to be cut.

32. A saw table assembly (10) as set forth in claim 31 wherein said material guide (48) includes a support channel (50) for engaging with said tongue (46) of one of said table sections (24, 26).

33. A saw table assembly (10) as set forth in claim 24 wherein said each of said pair of rails (12) includes a recess (18) supporting a rail glide strip (20) for allowing said table sections (24, 26) to move easily along said rails (12).

* * * * *